US010193389B2

(12) United States Patent
Moes et al.

(10) Patent No.: US 10,193,389 B2
(45) Date of Patent: Jan. 29, 2019

(54) MULTI-BRIDGE TOPOLOGY

(71) Applicant: Philips IP Ventures B.V., Eindhoven (NL)

(72) Inventors: Benjamin C. Moes, Wyoming, MI (US); Matthew J. Norconk, Grand Rapids, MI (US); Joshua B. Taylor, Rockford, MI (US); Colin J. Moore, Grand Rapids, MI (US)

(73) Assignee: PHILIPS IP VENTURES B.V., Eindhoven (NL)

( * ) Notice: Subject to any disclaimer, the term of this patent is extended or adjusted under 35 U.S.C. 154(b) by 14 days.

(21) Appl. No.: 15/584,086

(22) Filed: May 2, 2017

(65) Prior Publication Data
US 2017/0237297 A1    Aug. 17, 2017

Related U.S. Application Data

(63) Continuation of application No. 14/359,327, filed as application No. PCT/US2012/066589 on Nov. 27, 2012, now Pat. No. 9,680,398.
(Continued)

(51) Int. Cl.
H01F 27/42  (2006.01)
H01F 37/00  (2006.01)
(Continued)

(52) U.S. Cl.
CPC .............. H02J 50/10 (2016.02); H02J 7/025 (2013.01); H02J 17/00 (2013.01); H02J 50/12 (2016.02); H02M 7/5387 (2013.01); H02M 7/53871 (2013.01); H02M 2007/4818 (2013.01); Y02B 70/1441 (2013.01)

(58) Field of Classification Search
CPC ............. H02M 3/3376; H02M 1/4225; H02M 7/5387; H02M 7/53871; H02M 2007/4818; H02J 50/12; H02J 7/025
See application file for complete search history.

(56) References Cited

U.S. PATENT DOCUMENTS 5,008,801 A    4/1991  Giennon
5,949,658 A *  9/1999  Thottuvelil ....... H02M 3/33561
                                                363/132
(Continued)

FOREIGN PATENT DOCUMENTS

CN    101472376    7/2009
CN    101488718    7/2009
(Continued)

OTHER PUBLICATIONS

International Search Report and Written Opinion of the International Searching Authority for International Application No. PCT/US2012/066589 dated Jul. 30, 2013.

*Primary Examiner* — Rexford Barnie
*Assistant Examiner* — Rasem Mourad
(74) *Attorney, Agent, or Firm* — Larry Liberchuk

(57) ABSTRACT

A power supply with a multi-bridge topology configured to provide multiple different bridge topologies during operation. The power supply includes a plurality of half-bridge circuits connected to a controller. The controller can selectively configure the power supply between a plurality of different bridge topologies during operation by controlling the half-bridge circuit.

29 Claims, 15 Drawing Sheets

Related U.S. Application Data

(60) Provisional application No. 61/563,932, filed on Nov. 28, 2011.

(51) Int. Cl.

| | | |
|---|---|---|
| *H01F 38/00* | (2006.01) | |
| *H02J 50/10* | (2016.01) | |
| *H02J 50/12* | (2016.01) | |
| *H02M 7/5387* | (2007.01) | |
| *H02J 17/00* | (2006.01) | |
| *H02J 7/02* | (2016.01) | |
| *H02M 7/48* | (2007.01) | |

(56) References Cited

U.S. PATENT DOCUMENTS

| | | | |
|---|---|---|---|
| 7,212,414 B2 | 5/2007 | Baarman | |
| 7,522,878 B2 | 4/2009 | Baarman | |
| 8,004,235 B2 | 8/2011 | Baarman et al. | |
| 8,129,864 B2 | 3/2012 | Baarman et al. | |
| 8,446,046 B2 | 5/2013 | Fells et al. | |
| 2002/0126517 A1 | 9/2002 | Matsukawa et al. | |
| 2007/0085487 A1* | 4/2007 | Kuennen | A61L 2/10 315/209 R |
| 2007/0086225 A1 | 4/2007 | Baarman et al. | |
| 2008/0259646 A1* | 10/2008 | Moussaoui | H02M 3/33507 363/17 |
| 2009/0284369 A1* | 11/2009 | Toncich | G06K 7/0008 340/539.3 |
| 2010/0219696 A1 | 9/2010 | Kojima | |
| 2011/0038180 A1* | 2/2011 | Yang | H02M 3/3376 363/17 |
| 2011/0199045 A1* | 8/2011 | Hui | H02M 3/3376 320/108 |
| 2012/0068548 A1* | 3/2012 | Endo | H02J 5/005 307/104 |
| 2012/0163035 A1 | 6/2012 | Song et al. | |

FOREIGN PATENT DOCUMENTS

| | | | |
|---|---|---|---|
| CN | 101512888 | | 8/2009 |
| CN | 101719728 | | 6/2010 |
| CN | 101841244 | | 9/2010 |
| CN | 101488718 B | * | 11/2011 |
| EP | 1 227 571 | | 7/2002 |
| JP | 2003151751 A | | 5/2003 |
| JP | 2007032140 A | | 2/2007 |
| JP | 2009-213352 | | 9/2009 |
| JP | 2011176914 A | | 9/2011 |

* cited by examiner

MULTI-BRIDGE TOPOLOGY

BACKGROUND OF THE INVENTION

Some power supplies operate by applying AC power across an inverter bridge. A half bridge topology and a full bridge topology are two exemplary bridge topologies.

A half bridge topology is illustrated as part of an inductive power supply system in FIG. 1. The half bridge topology includes a controller 102, a tank circuit 104, and an inverter 106. The inverter 106 is implemented as a pair of switches, i.e. field effect transistors (FETs). The controller 102 is electrically connected to both switches in order to selectively couple a DC voltage source (V+) or a reference voltage (ground) to the tank circuit 104. In operation, the timing of the switches dictates the various characteristics of the AC signal that is generated.

A full bridge topology is illustrated as part of an inductive power supply system in FIG. 2. The full bridge topology includes a controller 202, a tank circuit 204, and two inverters 206, 207. Each inverter is implemented with a pair of switches, i.e. FETs. The controller is electrically connected to all of the switches in order to selectively couple a DC voltage source (V+) or a reference voltage (ground) to the tank circuit. In operation, the timing of the switches dictates the various characteristics of the AC signal generated.

SUMMARY OF THE INVENTION

A power supply with a multi-bridge topology can be configured to provide multiple different bridge topologies during operation. The power supply includes a controller, a first half-bridge circuit electrically connected to the controller, and a second half-bridge circuit electrically connected to the controller. The controller can selectively configure the power supply between a plurality of different bridge topologies during operation by controlling the switches in the first half-bridge circuit and the switches in the second half-bridge circuit.

The topologies that can be configured during operation by the controller depend on how the half-bridge circuits are electrically connected. In one embodiment, the first half-bridge circuit is electrically connected to a first terminal of a primary coil through a first capacitor and the second half-bridge circuit is electrically connected to the first terminal of the primary inductor through a second capacitor. In this embodiment, the controller of the power supply can operate the multi-bridge topology as a half bridge or a half bridge with a capacitive divider by changing how the switches are driven.

In another embodiment, the first half-bridge circuit is electrically connected to a first terminal of a primary inductor through a first capacitor and the second half-bridge circuit is electrically connected to a second terminal of the primary inductor. In this embodiment, the controller of the power supply can operate the multi-bridge topology as a full bridge or a half bridge.

The controller can control the first half-bridge circuit and the second half-bridge circuit by driving each either as a switching circuit, a DC source, a reference voltage, or an open circuit. How the switches of each half-bridge circuit are driven determines the bridge topology. Therefore, by changing how the controller drives the switches during operation, the bridge topology can be changed during operation.

With additional half-bridge circuits, additional bridge topologies are available to switch between. In one embodiment, the power supply includes a third half-bridge circuit electrically connected to the controller. The controller can selectively configure the power supply between a plurality of different bridge topologies during operation by controlling the first half-bridge circuit, the second half-bridge circuit, and the third half-bridge circuit.

In one embodiment, the controller can selectively configure the half-bridge circuits to adjust the resonant frequency. Depending on the capacitance of the capacitors and how the half-bridge circuit is driven, the capacitor can have a different effect on the power supply. Where two half-bridge circuits are both electrically connected to a primary inductor terminal through a capacitor, if the two half-bridge circuits are driven as switching circuits in phase with each other, then the capacitors will essentially be in parallel. If one of the half-bridge circuits is driven as a reference voltage and the other is driven as a switching circuit, then the capacitor electrically connected to the half-bridge being driven as a reference voltage will act as a voltage divider. The various bridge topologies available also vary depending on whether or not the capacitors are balanced or unbalanced. Balanced capacitors provide additional bridge topologies that have a common resonant frequency. Unbalanced capacitors provide additional bridge topologies that have different resonant frequencies. Other circuit components may be used as well to adjust the resonant frequency of the configured tank circuit. For example, these components may include capacitors, inductors, non-linear semiconducting components, or resistors. These components may be included in series or in parallel with the bridge configurations.

In one embodiment, the power supply includes a fourth half-bridge circuit electrically connected to the controller. The controller can selectively configure the power supply between a plurality of different bridge topologies during operation by controlling the first half-bridge circuit, the second half-bridge circuit, the third half-bridge circuit, and the fourth half-bridge circuit. Where the first half-bridge and the second half-bridge circuits are each electrically connected to one terminal of a primary inductor through a separate capacitor and the third half-bridge and the fourth half-bridge circuits are electrically connected to the other terminal of the primary inductor through a separate capacitor then the plurality of different bridge topologies includes a symmetrical full bridge and a symmetrical full bridge with capacitive divider.

The power supply can be implemented within a wireless power supply for supplying power wirelessly to a remote device. The controller can selectively configure the power supply between a plurality of different bridge topologies in response to a new remote device being placed near the wireless power supply, a remote device desiring more or less power, or a change in input power.

In one embodiment, the multi-bridge topology includes a primary inductor, a first inverter, a second inverter, and a controller. The first inverter includes a first switch for selectively coupling a first node to a first voltage source and a second switch for selectively coupling the first node to a first reference voltage. The first node is electrically connected to the first terminal of the primary inductor through a first capacitor. The second inverter includes a first switch for selectively coupling a second node to a second voltage source and a second switch for selectively coupling the second node to a second reference voltage. The second node is electrically connected to the first terminal of the primary inductor through a second capacitor. The controller can configure the multi-bridge topology between multiple different bridge topologies by controlling the first switch and the second switch of the first inverter and by controlling the first switch and the second switch of the second inverter.

The multi-bridge topology can include a third inverter having a first switch for selectively coupling a third node to a third voltage source and a second switch for selectively coupling the third node to a third reference voltage. The third node can be electrically connected to the second terminal of the primary inductor.

The first voltage source, the second voltage source, and the third voltage source can be the same voltage source and the first reference voltage, the second reference voltage, and the third reference voltage can be the same reference voltage, such as ground.

The controller can control the first switch of the first inverter, the second switch of the first inverter, the first switch of the second inverter, the second switch of the second inverter, the first switch of the third inverter, and the second switch of the third inverter to configure the multi-bridge topology to at least one of an equivalent full bridge topology, equivalent half bridge topology, full bridge topology with capacitive divider, and half bridge topology with capacitive divider.

The controller can control the first switch of the first inverter, the second switch of the first inverter, the first switch of the second inverter, the second switch of the second inverter, the first switch of the third inverter, and the second switch of the third inverter to configure the multi-bridge topology between a plurality of different bridge topologies, where each of the plurality of different bridge topologies have the same resonant frequency.

The controller can configure the multi-bridge topology to an equivalent full bridge by driving the first inverter as a switching circuit by operating the first switch of the first inverter and the second switch of the first inverter alternately, the controller driving the second inverter as a switching circuit by operating the first switch of the second inverter and the second switch of the second inverter alternately in phase with the first inverter, and the controller driving the third inverter as a switching circuit by operating the first switch of the third inverter and the second switch of the third inverter alternately, out of phase with the first and second inverters.

The controller can configure the multi-bridge topology to equivalent half bridge by driving the first inverter as a switching circuit by operating the first switch of the first inverter and the second switch of the first inverter alternately, the controller driving the second inverter as a switching circuit by operating the first switch of the second inverter and the second switch of the second inverter alternately in phase with the first inverter, and the controller driving the third inverter as a reference voltage by driving the first switch of the third inverter open and driving the second switch of the third inverter closed to provide a DC reference voltage. Alternatively, the controller may drive the first switch of the third inverter closed and the second switch of the third inverter open to provide a different DC reference voltage.

The controller can configures the multi-bridge topology to a full bridge with capacitive divider by the controller driving the first inverter as a switching circuit by operating the first switch of the first inverter and the second switch of the first inverter alternately, the controller operating the second inverter as a DC reference by driving the first switch of the second inverter open and driving the second switch of the second inverter closed, or by driving the first switch of the second inverter closed and the second switch of the second inverter open. The controller drives the third inverter as a switching circuit by operating the first switch of the third inverter and the second switch of the third inverter alternately, out of phase with the first inverter.

The controller can configure the multi-bridge topology to a half bridge with capacitive divider by the controller driving the first inverter as a switching circuit by operating the first switch of the first inverter and the second switch of the first inverter alternately, the controller operating the second inverter as a DC reference by driving the first switch of the second inverter open and driving the second switch of the second inverter closed, and the controller driving the third inverter as a DC reference by driving the first switch of the third inverter open and driving the second switch of the third inverter closed. Alternatively, the first switch of both the second and third inverters may be driven closed, and the second switch of both the second and third inverters may be driven open.

In one embodiment, a multi-bridge topology for a wireless power supply includes a primary inductor, a first inverter, a second inverter, and a controller. The first inverter includes a first switch for selectively coupling a first node to a voltage source and a second switch for selectively coupling the first node to a reference voltage, the first node is electrically connected to the first terminal of the primary inductor through a first capacitor. The second inverter includes a first switch for selectively coupling a second node to a voltage source and a second switch for selectively coupling the second node to a reference voltage, the second node is electrically connected to the second terminal of the primary inductor. The controller can configure the multi-bridge topology between a plurality of different bridge topologies by controlling the first switch and the second switch of the first inverter and controlling the first switch and the second switch of the second inverter.

By utilizing a multi-bridge topology, a transmitter can provide a variety of different bridge topologies. For example, some embodiments can switch between a full bridge topology and a half bridge topology. Some embodiments can switch between a topology that includes a capacitive voltage divider and a topology that does not. The ability to switch between multiple bridge topologies allows a power supply to be configured, during operation, to quickly provide power at different levels. That is, the power supply can provide a certain range of power in a full bridge topology, and a different range of power in a half bridge topology, or a full bridge topology with capacitive divider. Additionally, in certain configurations, the power supply can provide these different power ranges while maintaining a constant resonant frequency for the power supply.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

Figure 3:
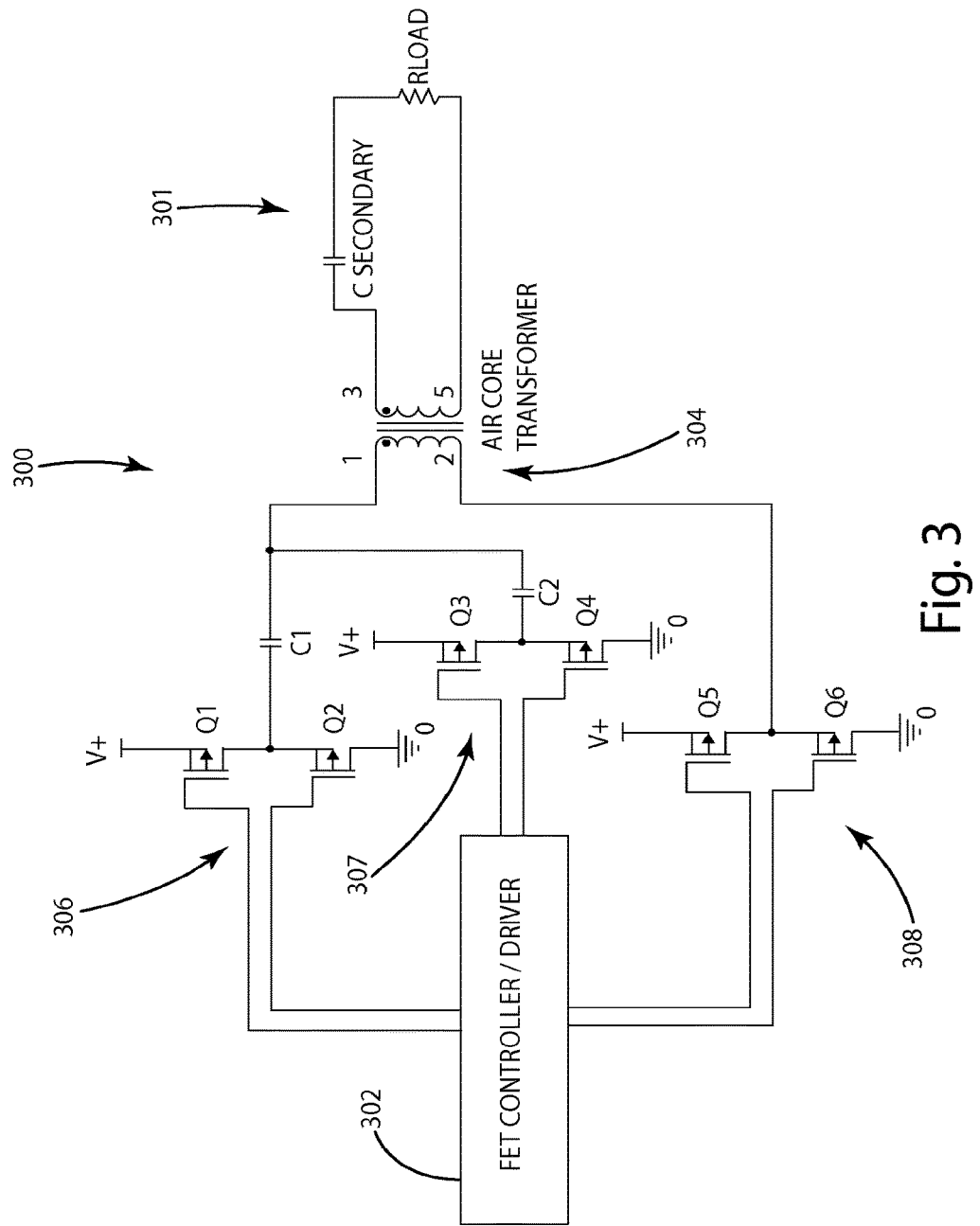
FIG. 3 illustrates one embodiment of a wireless power supply with a multi-bridge circuit topology.

The present disclosure relates to a power supply with a multi-bridge topology that can be configured to provide multiple different bridge topologies during operation. One embodiment of a power supply 300 with a multi-bridge topology and secondary 301 is illustrated in FIG. 3. The power supply 300 includes a controller 302, three half-bridge circuits 306, 307, 308 or inverters, and a primary inductor 304. All three half-bridge circuits are in electrical communication with the controller 302. The controller 302 can selectively configure the power supply between a plurality of different bridge topologies during operation by controlling the switches in each half-bridge circuit 306, 307, 308.

By swapping between multiple bridge topologies, the power supply can provide different ranges of power. For example, depending on how the power supply is configured, the power supply of FIG. 3 can provide four different levels of power. Four different equivalent circuits 802, 804, 806, 808 are illustrated in FIG. 8 that show four different bridge topologies that are capable of being configured using the power supply of FIG. 3. The depicted bridge topologies include: full bridge 802, full bridge with capacitive divider 804, half bridge 806, and half bridge with capacitive divider 808. A full description of each bridge topology is described in connection with FIGS. 4-7 below.

Figure 4:
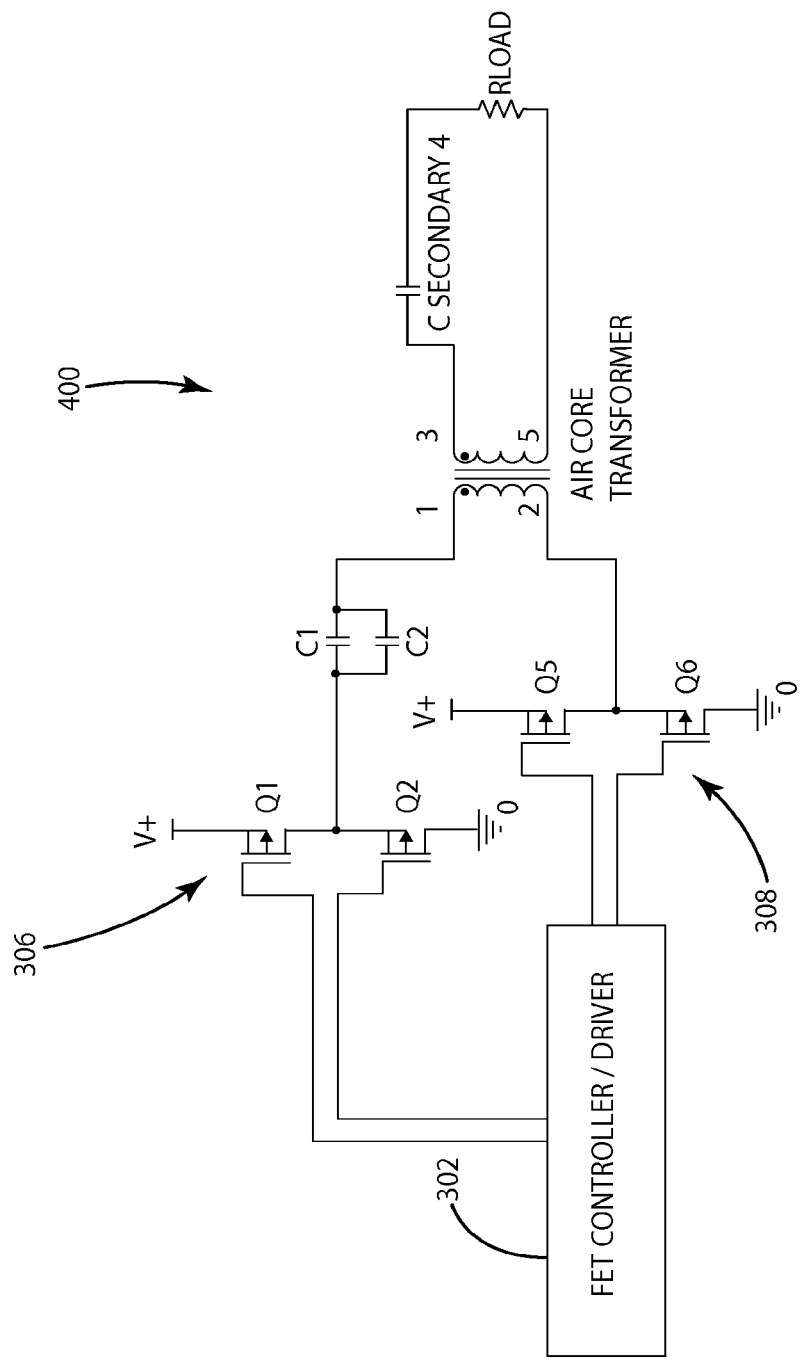
FIG. 4 illustrates an equivalent full bridge topology configuration of the multi-bridge circuit topology.

FIG. 4 will now be described in detail. FIG. 4 shows the effective circuit 400 created by the FIG. 3 power supply when the first inverter 306 (Q1, Q2) and the second inverter 307 (Q3, Q4) are driven in phase and third inverter 308 (Q5, Q6) is driven 180° out of phase. This effectively creates a full bridge topology.

In order to configure this bridge topology, the controller 302 drives the first inverter 306 (Q1, Q2) as a switching circuit by operating the first switch (Q1) of the first inverter and the second switch (Q2) of the first inverter alternately. The controller 302 also drives the second inverter 307 (Q3, Q4) as a switching circuit by operating the first switch (Q3) of the second inverter and the second switch (Q4) of the second inverter alternately in phase with the first inverter. Finally, the controller drives the third inverter 308 (Q5, Q6) as a switching circuit by operating the first switch (Q5) of the third inverter and the second switch (Q6) of the third inverter alternately, out of phase with the first and second inverters. For clarity, the second inverter is not depicted in FIG. 4, but rather the equivalent circuit 400 in this configuration is shown.

Figure 5:
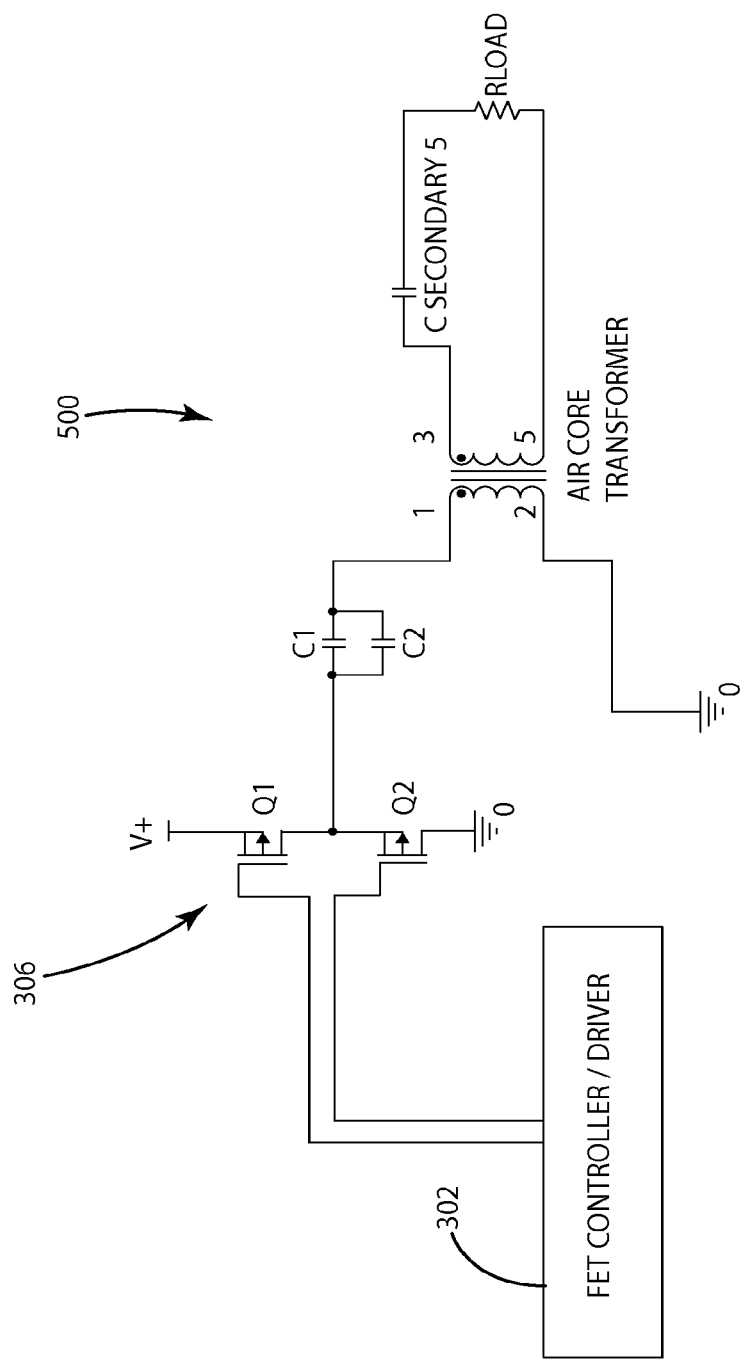
FIG. 5 illustrates an equivalent half bridge topology configuration of the multi-bridge circuit topology.

FIG. 5 will now be described in detail. FIG. 5 shows the effective circuit 500 created by the FIG. 3 power supply when the first inverter 306 (Q1, Q2) and the second inverter 307 (Q3, Q4) are driven in phase and the third inverter 308 (Q5, Q6) is tied to a reference voltage. This effectively creates a half bridge topology. In order to configure this bridge topology, the controller drives the first inverter 306 (Q1, Q2) as a switching circuit by operating the first switch (Q1) of the first inverter and the second switch (Q2) of the first inverter alternately. The controller also drives the second inverter 307 (Q3, Q4) as a switching circuit by operating the first switch (Q3) of the second inverter and the second switch (Q4) of the second inverter alternately in phase with the first inverter. Finally, the controller 302 drives the third inverter 308 (Q5, Q6) as a reference voltage by driving the first switch (Q5) of the third inverter open and driving the second switch (Q6) of the third inverter closed to provide a DC reference voltage. Alternatively, the controller may drive the first switch (Q5) of the third inverter closed and drive the second switch (Q6) of the third inverter open to provide a DC reference voltage. For clarity, the second and third inverters are not shown in FIG. 5, but rather the equivalent circuit 500 in this configuration is shown.

The term driving is utilized to indicate how the controller is telling the switch to act. In some circumstances a switch may be driven by the absence of a signal rather than the presence of one. For example, where a 0V signal is applied to a switch that may "drive" the switch open. Different switches or transistors may react differently to different control signals.

Figure 6:
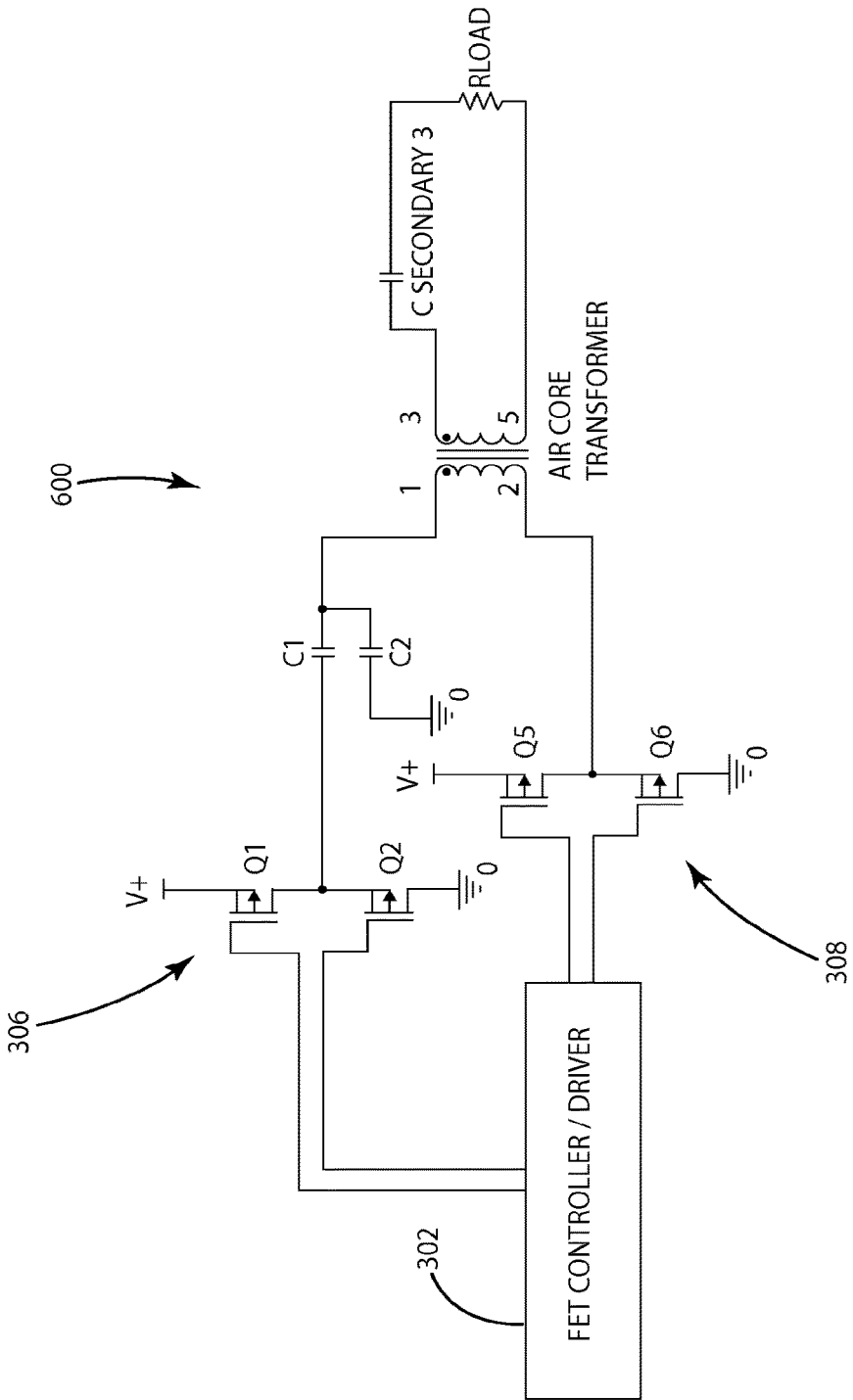
FIG. 6 illustrates an equivalent full bridge topology with capacitive divider configuration of the multi-bridge circuit topology.

FIG. 6 will now be described in detail. FIG. 6 shows the effective circuit created by the FIG. 3 power supply when the first inverter 306 (Q1, Q2) and the third inverter 308 (Q5, Q6) are both driven 180 degrees out of phase with one another, and the second inverter 307 is driven to the reference voltage. This creates a full bridge drive system with a capacitive voltage divider being used on the high side. In order to configure this bridge topology, the controller 302 drives the first inverter 306 (Q1, Q2) and the third inverter 308 (Q5, Q6) as switching circuits by operating the first switch (Q1) of the first inverter 306 and the second switch (Q2) of the first inverter 306 alternately and by operating the first switch (Q5) of the third inverter 308 and the second switch (Q6) of the third inverter 308 alternately, but 180 degrees out of phase with the first inverter 306. Finally, the controller 302 drives the second inverter 307 (Q3, Q4) as a reference voltage by driving the first switch (Q3) of the second inverter 307 open and the second switch (Q4) of the second inverter 308 closed. Alternatively, the controller 302 may drive the first switch (Q3) of the second inverter 307 closed and the second switch (Q4) of the second inverter 307 open to provide a reference voltage. For clarity, the second inverter 307 is not shown in FIG. 6, but rather the equivalent circuit 600 in this configuration is shown.

Figure 7:
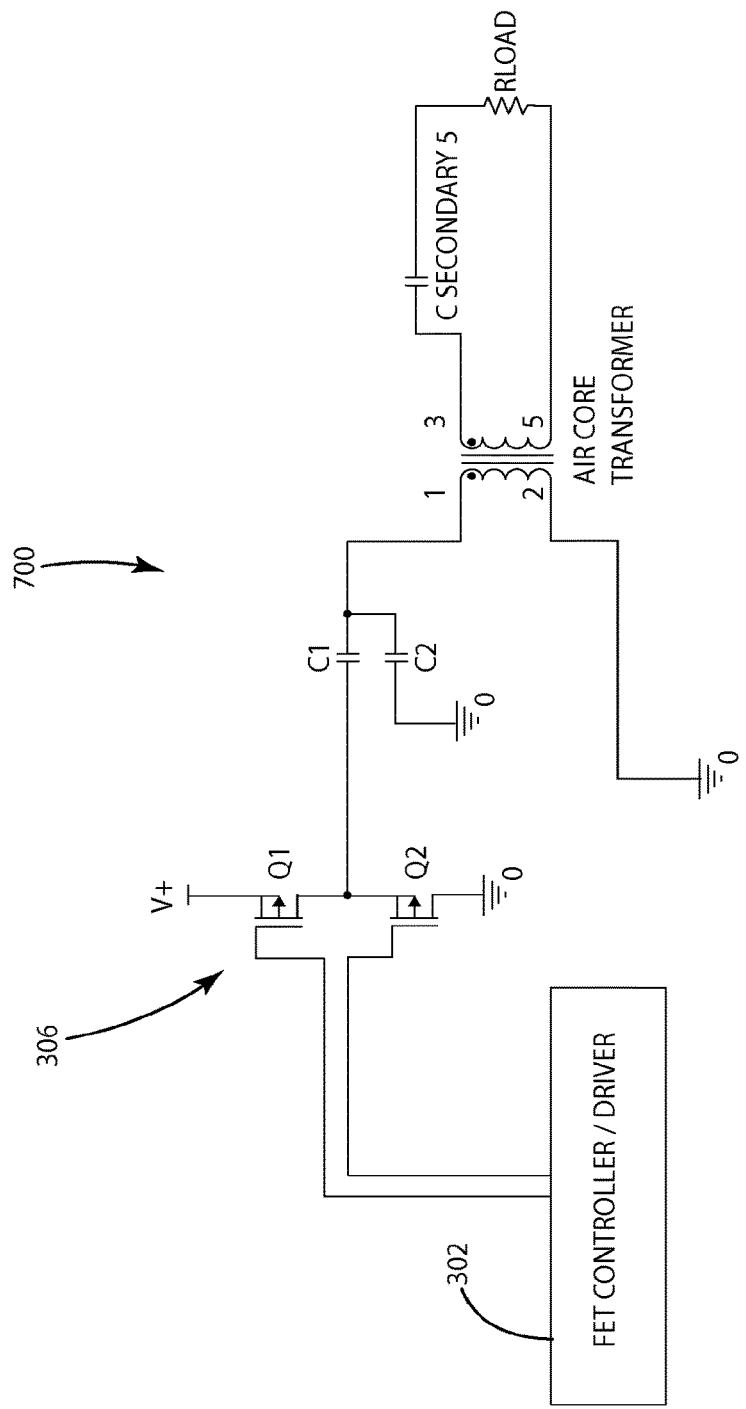
FIG. 7 illustrates an equivalent half bridge topology with capacitive divider configuration of the multi-bridge circuit topology.
Figure 8:
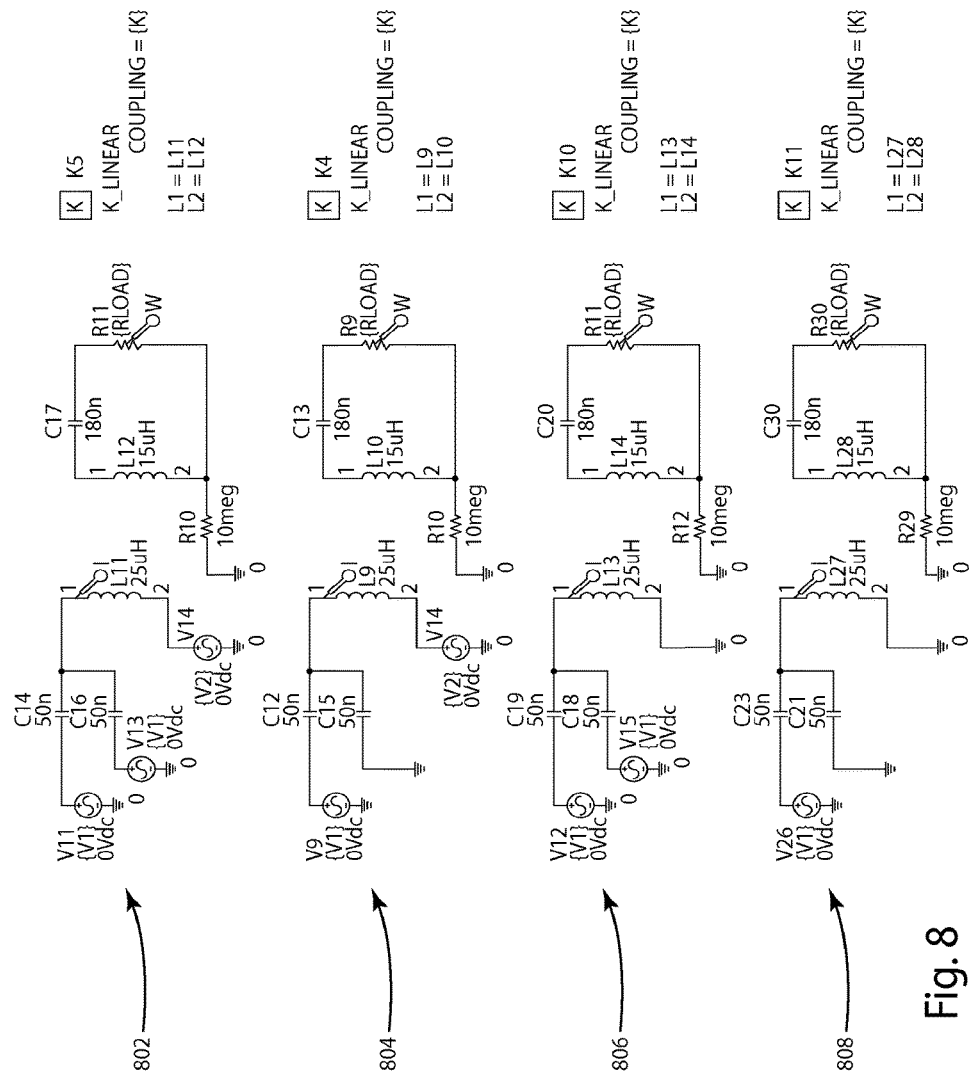
FIG. 8 illustrates four configurations for the multi-bridge topology.

FIG. 7 will now be described in detail. FIG. 7 shows the effective circuit 700 created by the FIG. 3 power supply when the first inverter 306 (Q1, Q2) is driven as a switching circuit while the second inverter 307 and third inverter 308 are driven to a reference voltage. This creates a half bridge circuit with a capacitive voltage divider being used on the high side. In order to configure this bridge topology, the controller 302 drives the first inverter 306 (Q1, Q2) as a switching circuit by operating the first switch (Q1) of the first inverter and the second switch (Q2) of the first inverter alternately. The controller 302 also drives the second inverter 307 (Q3, Q4) and third inverter 308 (Q5, Q6) as a reference voltage by driving the first switches (Q3, Q5) of the second inverter 307 and third inverter 308 open and driving the second switches (Q4, Q6) of the second inverter 307 and third inverter 308 closed so that a connection to the reference voltage is made. Alternatively, the controller 302 may drive the first switches (Q3, Q5) of the second inverter 307 and third inverter 308 closed and the second switches (Q4, Q6) of the second inverter 307 and third inverter 308 open so that a connection to a reference voltage is made. For clarity, the second inverter 307 and third inverter 308 are not shown in FIG. 7, but rather the equivalent circuit 700 in this configuration is shown.

Figure 9:
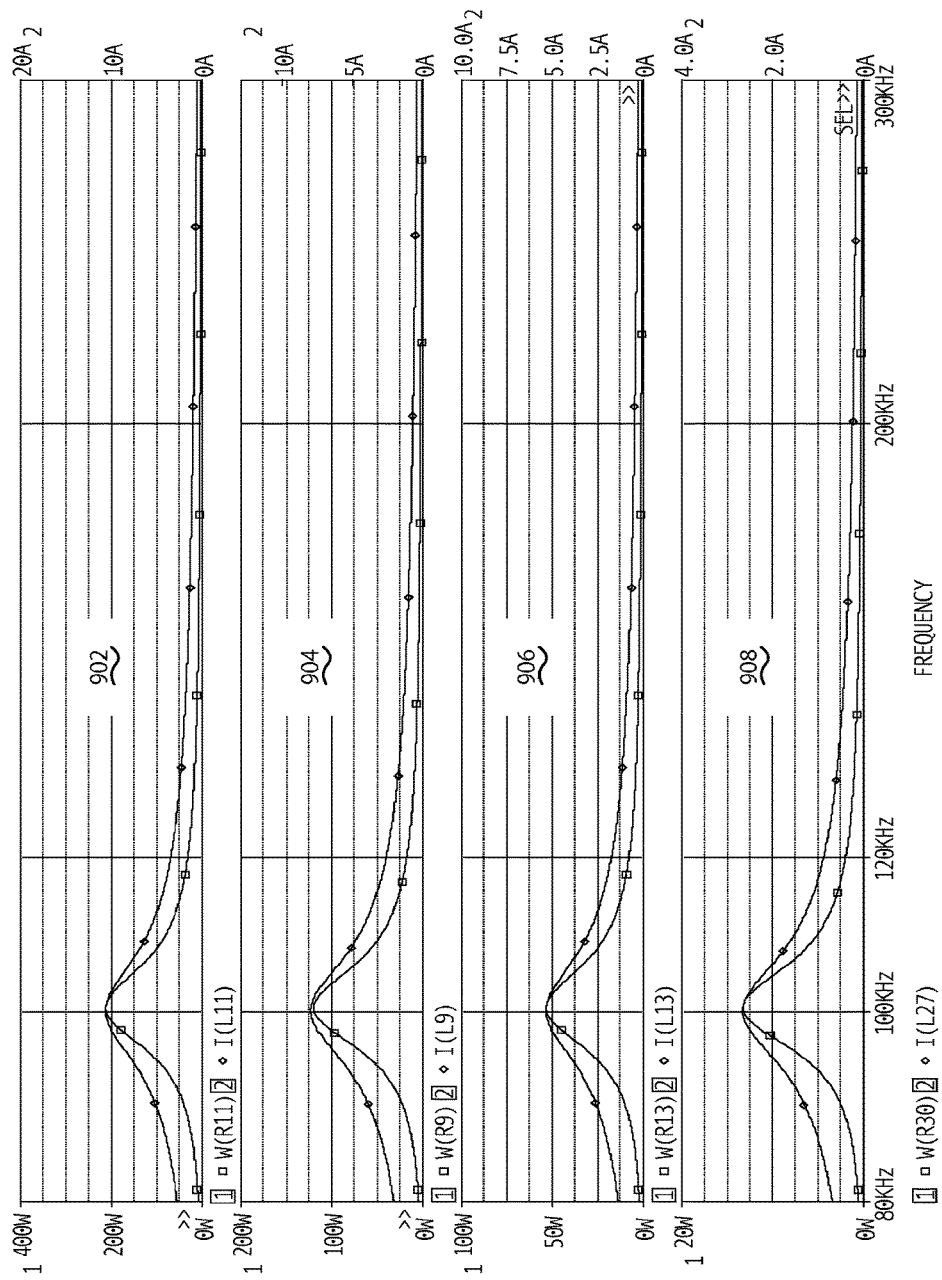
FIG. 9 illustrates the received power and coil current of each respective configuration illustrated in FIG. 8.

FIG. 9 illustrates the current through the primary inductor and the power delivered to the load in a remote device for each of these bridge topologies. The graph of the full bridge 902 illustrates that that power supply can supply power at about the 200 watt range with about 10 amps of current through the primary coil. The graph of the full bridge with capacitive divider 904 shows that the power supply can supply power at about the 100 watt range with about 7 amps of current through the primary inductor. The graph of the half bridge 906 shows that the power supply can deliver about 50 watts of power to the load with about 5 amps of current through the primary inductor. The graph of the half bridge with voltage divider 908 shows that the power supply can deliver about 10 watts of power to the load with about 3 amps of current through the primary inductor.

FIG. 9 also shows that the resonant frequency of the power supply is the same in each of these four configurations, about 100 KHz. When this type of multi-bridge topology is being implemented into a wireless power supply it can be useful to have multiple topologies that provide different ranges of power at the same resonant point.

Switching between different bridge topologies allows the power supply to provide power at different levels. The power can be further tuned at those levels. That is, the bridge topology can be a macro adjustment that enables the power supply to provide a range of power and an additional adjustment can be utilized as a fine tune, or micro adjustment. Each bridge topology has a maximum amount of power that can be delivered to the load for a given input signal (i.e. given operating frequency, duty cycle, and rail voltage). That amount can be adjusted downward in a variety of different ways. Some examples of characteristics that can be used to make a fine tune adjustment after the bridge topology is selected include the operating frequency, rail voltage, duty cycle, or phase of the half bridge. For example, in FIG. 9 if the appropriate inverters are driven at about 90 KHz, then less power will be delivered to the load.

The step size of the adjustment (i.e. the change in output power per change in characteristic) may not be the same for each characteristic and for each bridge topology. For example, adjusting the operating frequency by a few hertz in a full bridge configuration may result in a larger adjustment to the output power than if that same few hertz adjustment were made in a half bridge topology.

The ability to provide different bridge topologies on the fly during operation can be an alternative to costly reconfiguration of primary inductors by changing turns or taps. Further, it can also be an alternative to expensive addition of banks of inductors and/or capacitors that are used in some power supplies to adjust the range of output power.

The ability to use capacitive dividers enables the power supply to provide additional power ranges. For example, when switching between a full bridge topology and a half bridge topology for a given operating frequency, rail voltage, duty cycle, the power is cut by about a factor of four. However, by utilizing a capacitive divider in conjunction with a full bridge, the power is cut by about a factor two. Additionally, utilizing a capacitive divider in conjunction with a half bridge, enables the power (when compared to the full bridge) to be cut by about a factor of 10. Utilizing additional half-bridge circuits can give the power supply the ability to provide additional ranges of power. For example, if there were three half-bridge circuits each electrically connected to the terminal of a primary inductor through a separate capacitor then the maximum power output can be cut by ⅓ or ⅔ depending on whether one or two of the half-bridge circuits are driven as a reference voltage, respectively.

Referring back to FIG. 3, the current embodiment is a multi-bridge inverting topology where three half bridge circuits are used to drive a wireless power system. The first inverter 306 (Q1, Q2) and the third inverter 308 (Q5, Q6) can together form a full bridge system. The second inverter 307 (Q3, Q4) provides the power supply the option of being configured in a full bridge topology, a half bridge topology, and also provides the ability to include a capacitive divider to reduce the power being transmitted.

The terms half-bridge circuit and inverter are used throughout the disclosure interchangeably to refer to a pair of switches that share a common node, where each switch is driven by a control signal. The switches can be field effect transistors, such as MOSFETs, BJTs, or other types of transistors or switches.

The half-bridge circuit can selectively couple a voltage source or a reference voltage to the common node. As shown in FIG. 3, the high side switches (Q1, Q3, Q5) are all associated with a voltage source, V+ in the depicted embodiment, and the low side switches (Q2, Q4, Q6) are all associated with a reference voltage, ground in the depicted embodiment. Each half-bridge circuit can be configured in at least four ways: as a switching circuit, as a DC reference voltage, as a DC voltage source, or as an open circuit. To operate a half-bridge as a switching circuit, the low-side FET and the high-side FET are driven alternately. To operate a half-bridge as a DC voltage source, the low-side FET is driven off to create an open circuit between the common node and the reference voltage and the high-side FET is driven on to create a connection to the DC rail voltage, V+. To operate a half-bridge as a reference voltage, the low-side FET is driven on to create a connection to the reference voltage and the high-side FET is driven off to create an open circuit between the node and the voltage source. To operate a half-bridge circuit as an open circuit, both FETs are driven off to create an open circuit between the common node and both the voltage source and the reference voltage. By configuring the half-bridge circuits, a variety of different bridge topologies can be implemented, including a full bridge topology (see FIG. 4), a full bridge topology with capacitive divider (FIG. 6), a half bridge topology (FIG. 5), and a half bridge topology with capacitive divider (FIG. 7). Additional half-bridge circuits can enable additional bridge topologies, such as symmetric full bridge and symmetric full bridge with capacitive divider.

FIGS. 4-7 illustrate the equivalent circuit in a particular configuration. For clarity, the extra inverter components have been removed from these diagrams where appropriate. For example, in FIG. 7, the capacitive divider created by C2 is created because the inverter (not shown) has one FET driven to create a connection to the reference voltage and the other FET driven to create an open circuit between the inverter node and the voltage source.

In each configuration, the resonant frequency (F) of the power supply is generally defined as:

$$F = \frac{1}{\sqrt{2\pi(C1+C2)Lcoil}}$$

In embodiments where the capacitors are balanced, C1 and C2 are approximately equal. In embodiments where the capacitors are unbalanced, C1 and C2 are unequal.

In one embodiment, the capacitors C1, C2 are balanced. Accordingly, when switching between the following bridge topologies: full bridge, full bridge with capacitive divider, half bridge, and half bridge with capacitive divider, the power supply maintains its resonant frequency.

Figure 1:
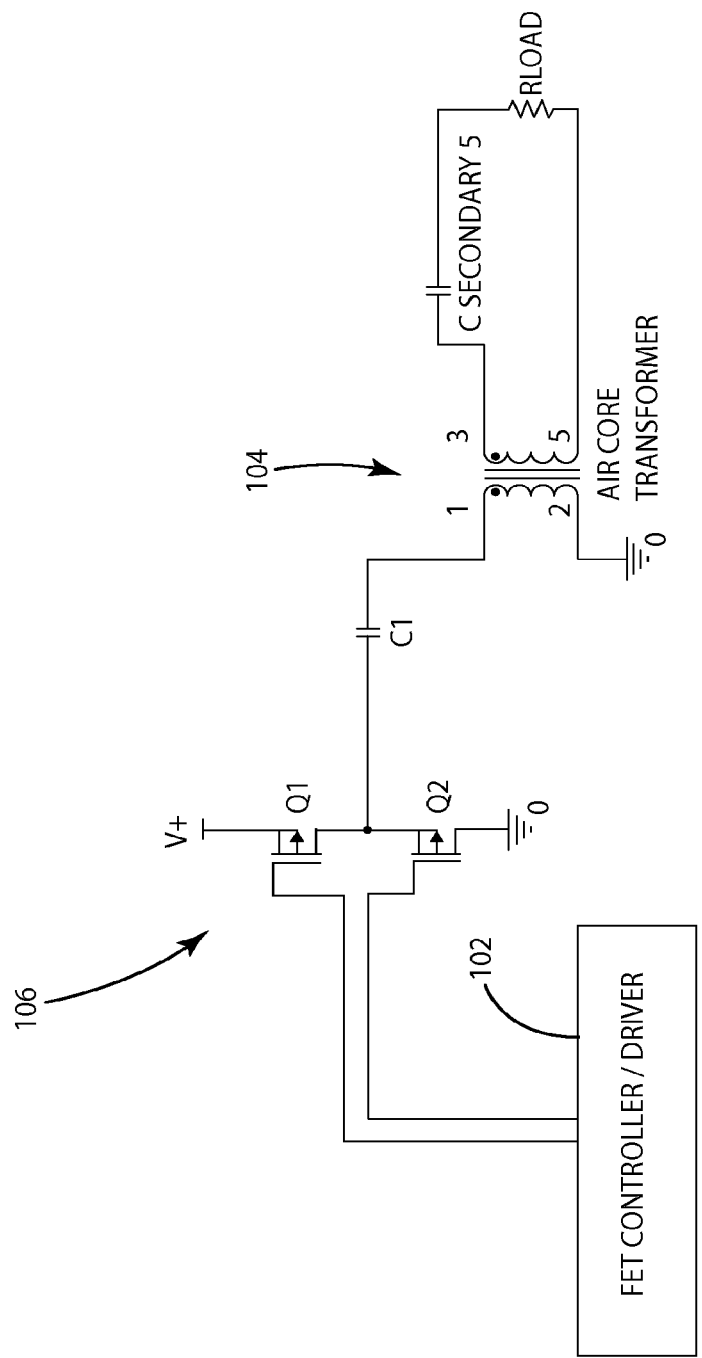
FIG. 1 illustrates a wireless power supply utilizing half bridge circuit topology.
Figure 2:
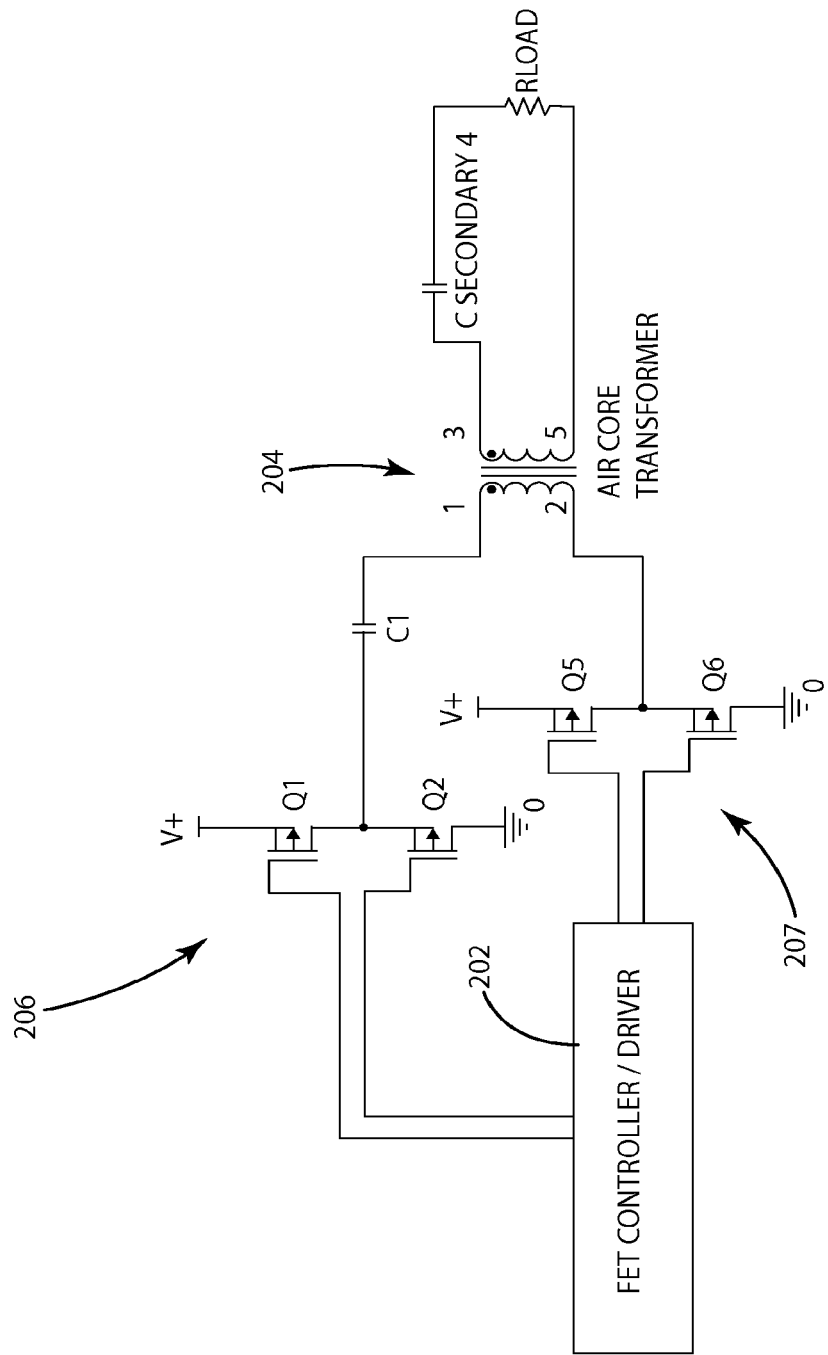
FIG. 2 illustrates a wireless power supply utilizing full bridge circuit topology.

In another embodiment that uses the same multi-bridge topology shown in FIG. 3, the system can change its resonant frequency by configuring one of the half-bridge circuits in an open circuit configuration. In this embodiment, the power supply circuit would look essentially like FIG. 2, where C2 is not included in the circuit. That is, the second inverter is configured to an open circuit so both switches of the second inverter (Q3, Q4) are driven off and neither the voltage source nor the reference voltage are connected to the common node next to the capacitor C2. By doing so, C2 is no longer in circuit, and the resonant frequency of the system is defined by solely by C1 and Lcoil instead of (C1+C2) and Lcoil.

Figure 14:
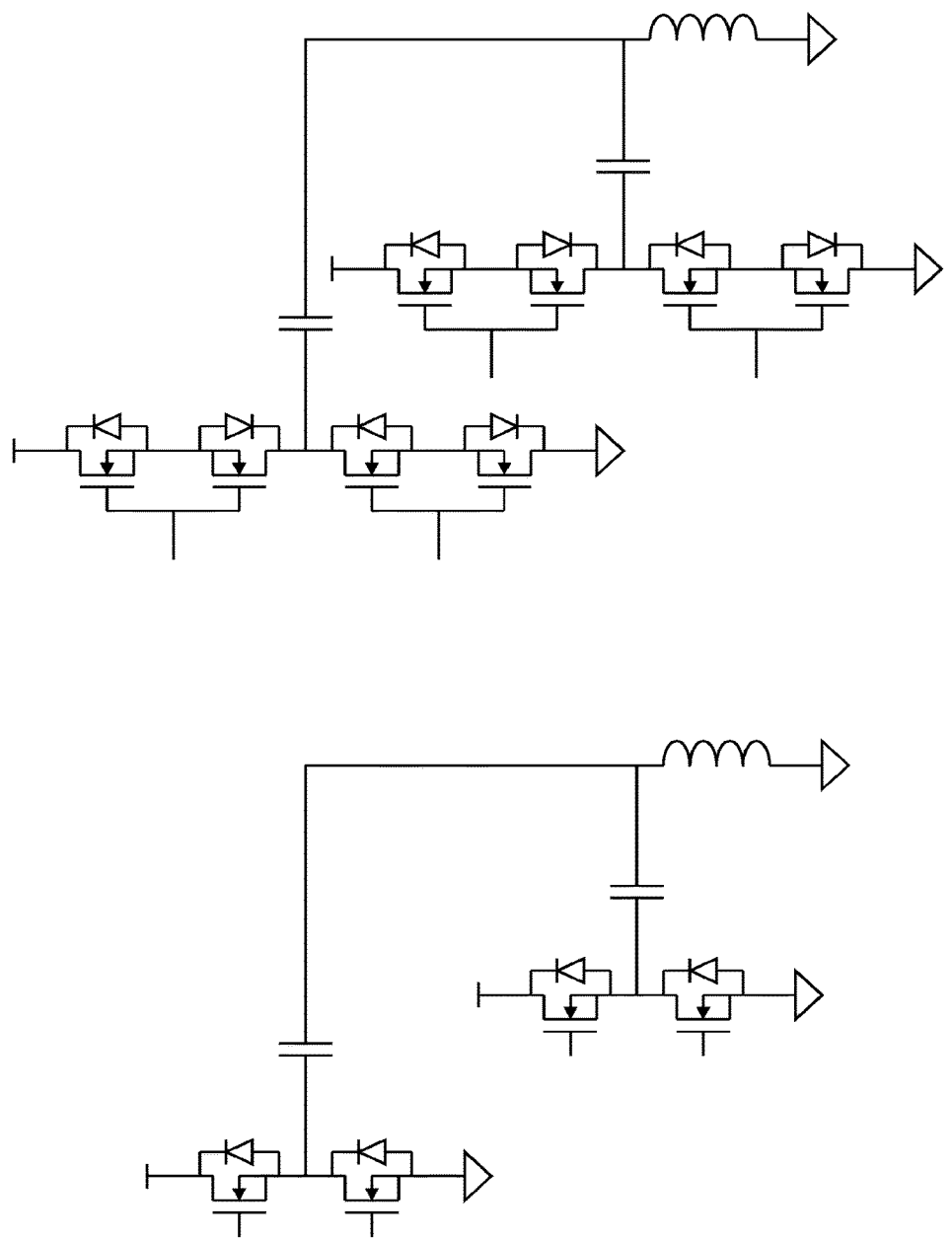
FIG. 14 illustrates back to back FETs for each inverting "switch" location.
Figure 15:
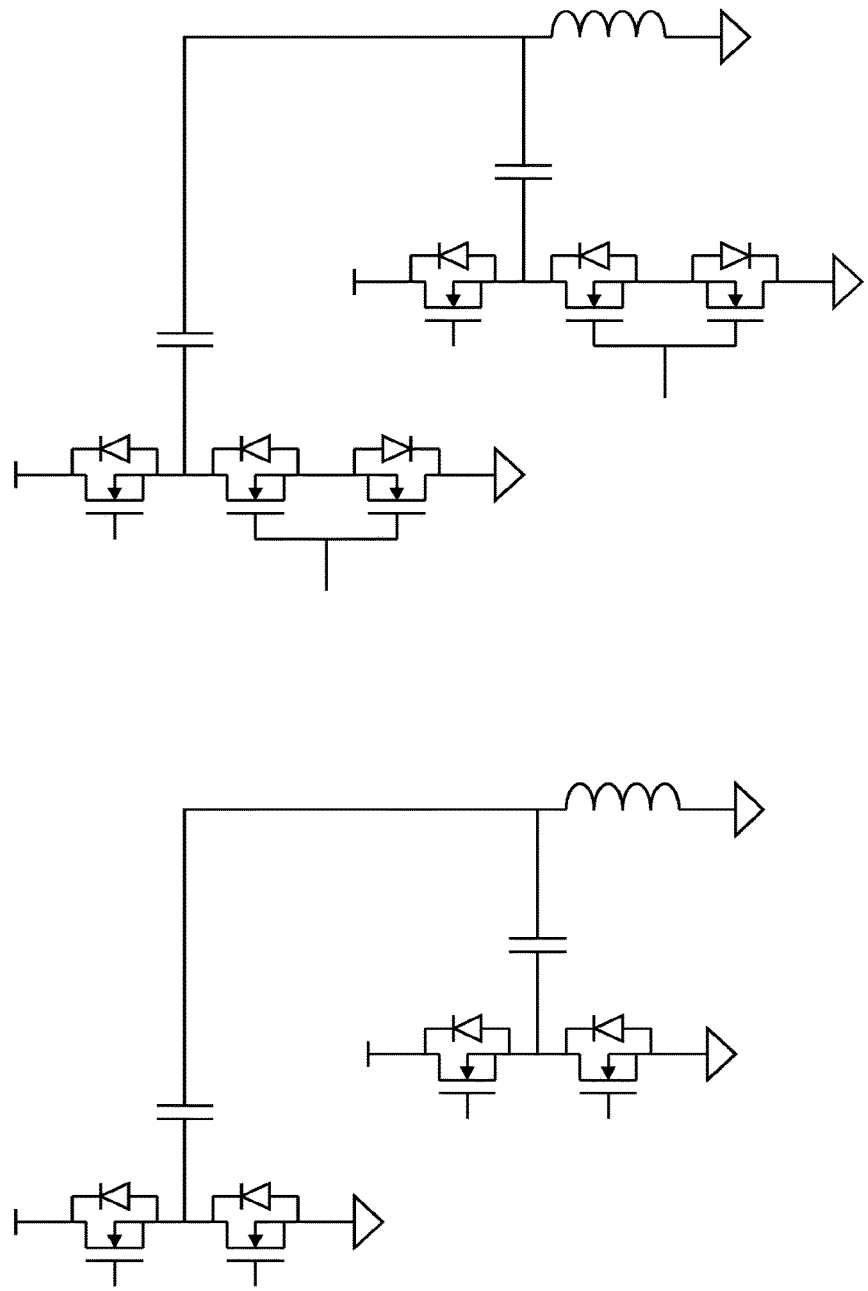
FIG. 15 illustrates back to back FETs for only low side switching locations.

In embodiments where the power supply configures a half bridge circuit to an open circuit configuration an additional FET to prevent body diode conduction can be implemented. FIG. 14 shows back to back FETs for the high and low side switches. FIG. 15 shows an alternative construction where back to back FETs are included only for the low side switch. These constructions help to prevent body diode conduction.

Figure 10:
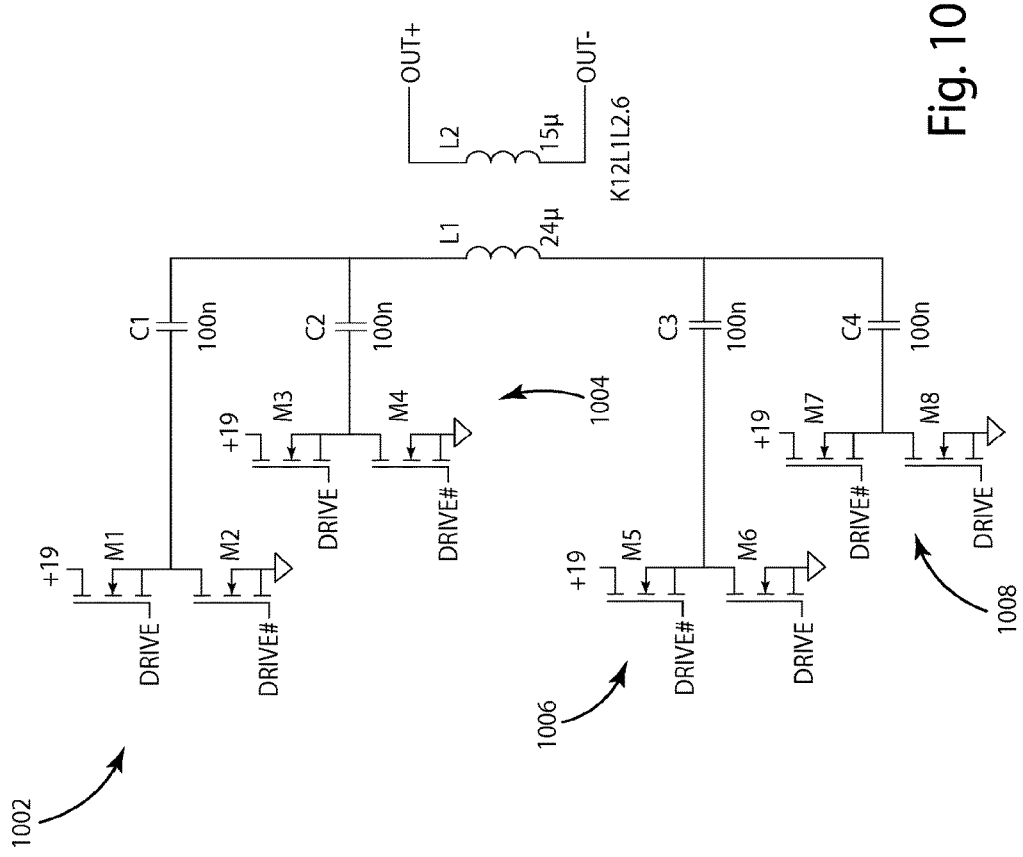
FIG. 10 illustrates an embodiment of a wireless power supply with a symmetrical drive multi-bridge circuit topology.
Figure 11:
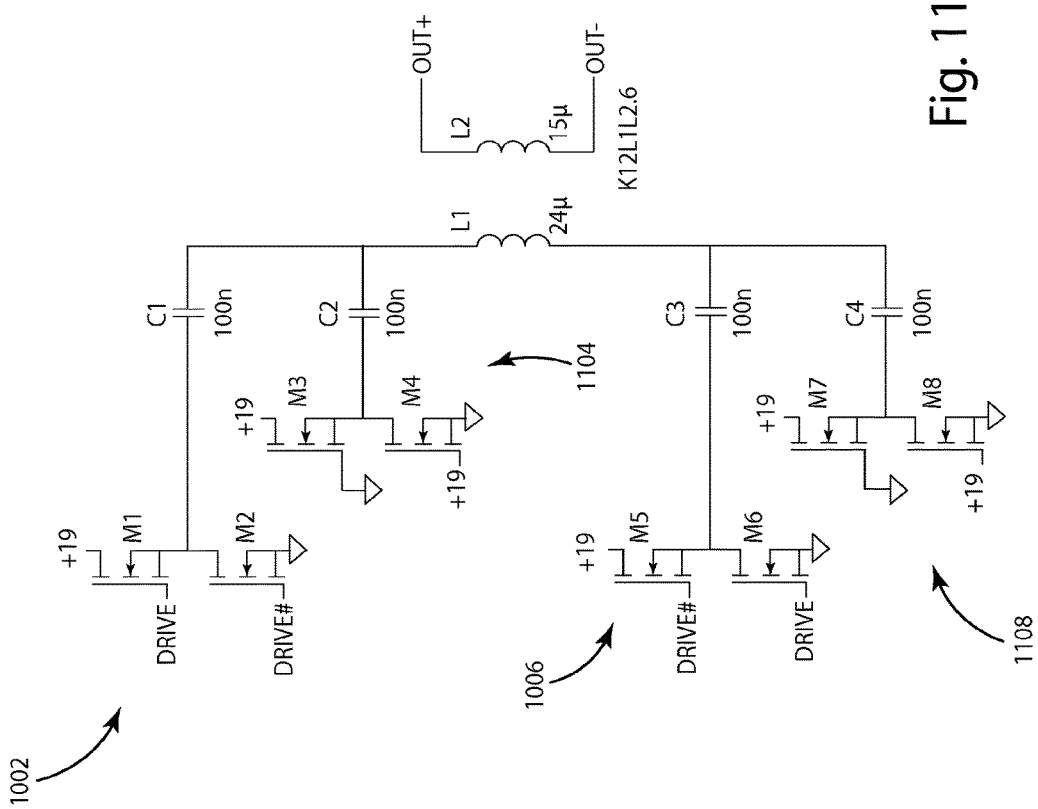
FIG. 11 illustrates an embodiment of a wireless power supply with a symmetrical drive multi-bridge circuit topology with capacitive dividers.

Some embodiments can include additional half bridge circuits. One embodiment includes four half bridge circuits, two on each side of the primary inductor. This effectively makes the coil drive symmetrical, which can reduce electromagnetic interference, reduce electromagnetic compatibility concerns, and have benefits for communications signal strength. To claim the benefits of symmetrical drive, the primary inductor can be driven full bridge or full bridge with capacitive divider. That is, one power level can be achieved by driving all four half bridge circuits 1002, 1004, 1006, 1008, as shown in FIG. 10. Alternatively, a second power level can be achieved by grounding one set of FETs 1104, 1108 on each side of the primary inductor and driving the other FETs 1002, 1006, as shown in FIG. 11. This configuration also maintains a constant resonant frequency.

More than four half bridge circuits can be utilized in other alternative embodiments. Each of the illustrated embodiments show one or two half-bridge circuits connected to a primary inductor terminal, however, essentially any number of half-bridge circuits can be connected through separate capacitors to the primary inductor terminal. The capacitor values can be adjusted to maintain a desired resonant frequency. The capacitor values can also be unbalanced or non-matching to allow specific power steps other than doubling or halving, such as what is shown in FIGS. 12 and 13.

Figure 12:
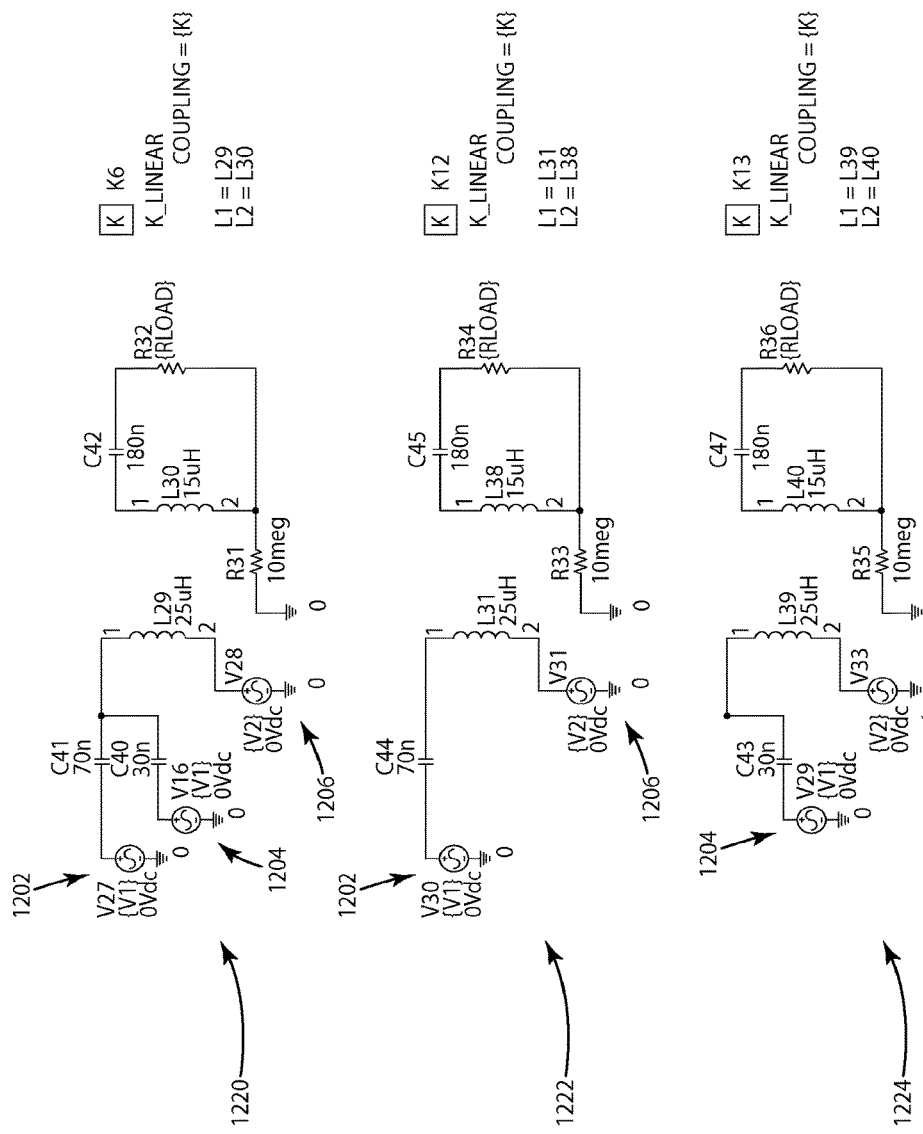
FIG. 12 illustrates three full bridge configurations where the capacitors for each inverter are unbalanced.

FIG. 12 shows three full bridge configurations 1220, 1222, 1224 where the capacitors for each inverter are not balanced. In these configurations, the transmitter or power supply can select both capacitors by driving both inverters 1202, 1204, (1220) or can select either one by driving the first inverter 1202 (1222) or the second inverter 1204 (1224), and keeping both FETs of the non-driven inverter off (rather than leaving one on and one off).

Figure 13:
FIG. 13 illustrates the received power and coil current of each respective configuration illustrated in FIG. 12. Each configuration has a different resonant point because each configuration has a different effective capacitance.

FIG. 13 shows how there are three different resonant points because three different effective capacitance values can be selected. Full bridge configuration 1220 corresponds to graph 1320, full bridge configuration 1222 corresponds to graph 1322, and full bridge configuration 1224 corresponds to graph 1324. The effective power transfer is reduced as the resonant frequency of the transmitter moves farther away from the resonant frequency of the receiver (100 kHz in this case). In some embodiments, the resonant frequency of the receiver may vary or different receivers may have different resonant frequencies.

Pertaining to EMC, EMI concerns, operating closer to resonance and with both high and low side switches running at 50% duty cycle tends to reduce interference. This can lead to issues reducing power by a device that is done charging or in a standby state. By switching drive topology, output power can be reduced while staying near resonance and operating at a higher duty cycle, thus improving interference characteristics.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A wireless power supply for supplying power wirelessly to a remote device, the wireless power supply comprising:
   a controller;
   a first half-bridge circuit electrically connected to the controller;
   a second half-bridge circuit electrically connected to the controller;
   wherein the controller selectively configures the wireless power supply between a plurality of different bridge topologies during operation by controlling the first half-bridge circuit and the second half-bridge circuit;
   wherein the controller selects a bridge topology from the plurality of different bridge topologies in response to inductive coupling of the remote device to the wireless power supply and based on feedback from the remote device;
   wherein, in response to the wireless power supply being configured to the selected bridge topology, the controller selectively configures the wireless power supply to fine tune an amount of power delivered to the remote device by adjusting a characteristic of at least one of the half bridge circuits based on feedback from the remote device;
   wherein the controller selects a different bridge topology from the plurality of different bridge topologies in response to inductive coupling of a new remote device to the wireless power supply and based on feedback from the new remote device;
   wherein, in response to the wireless power supply being configured to the different bridge topology, the controller selectively configures the wireless power supply to fine tune an amount of power delivered to the new remote device by adjusting a characteristic of at least one of the half bridge circuits based on feedback from the new remote device.

2. The wireless power supply of claim 1 wherein step size of the adjustment of the characteristic varies based on the selected bridge topology.

3. The wireless power supply of claim 1 wherein the characteristic of at least one of the half bridge circuits includes at least one of operating frequency, rail voltage, duty cycle, and phase of at least one of the half bridge circuits.

4. The wireless power supply of claim 1 wherein the different bridge topologies include a full bridge and a half bridge.

5. The wireless power supply of claim 1 wherein the first half-bridge circuit and the second half-bridge circuit are electrically connected to a tank circuit including a primary coil and a capacitor, wherein the tank circuit inductively couples to the remote device via an air core in response to placement near the wireless power supply.

6. A wireless power supply that supplies power wirelessly to a remote device, the wireless power supply comprising:
   a primary inductor having a first terminal and a second terminal;
   a first inverter including a first switch for selectively coupling a first node to a first voltage source and a second switch for selectively coupling the first node to a first reference voltage, the first node is electrically connected to the first terminal of the primary inductor;
   a second inverter including a first switch for selectively coupling a second node to a second voltage source and a second switch for selectively coupling the second node to a second reference voltage, the second node is electrically connected to the second terminal of the primary inductor; and
   a controller for configuring the wireless power supply between a plurality of different bridge topologies by controlling the first switch and the second switch of the first inverter and by controlling the first switch and the second switch of the second inverter;
   wherein the controller selects a bridge topology from the plurality of different bridge topologies in response to inductive coupling of the remote device to the wireless power supply and based on feedback from the remote device;
   wherein, in response to the wireless power supply being configured to the selected bridge topology, the controller selectively configures the wireless power supply to fine tune an amount of power delivered to the remote device by adjusting a characteristic of at least one of the inverters based on feedback from the remote device;
   wherein the controller selects a different bridge topology from the plurality of different bridge topologies in response to inductive coupling of a new remote device to the wireless power supply and based on feedback from the new remote device;
   wherein, in response to the wireless power supply being configured to the different bridge topology, the controller selectively configures the wireless power supply to fine tune an amount of power delivered to the new remote device by adjusting a characteristic of at least one of the inverters based on feedback from the new remote device.

7. The wireless power supply of claim 6 wherein the first node is electrically connected to the first terminal of the primary inductor through one or more capacitors and wherein the second node is electrically connected to the second terminal of the primary inductor through one or more capacitors.

8. The wireless power supply of claim 6 wherein the first voltage source and the second voltage source are the same voltage source.

9. The wireless power supply of claim 6 wherein step size of the adjustment of the characteristic varies based on the selected bridge topology.

10. The wireless power supply of claim 6 wherein the characteristic includes operating frequency, rail voltage, duty cycle, and phase of at least one of the half bridge circuits.

11. The wireless power supply of claim 6 wherein the different bridge topologies include a full bridge and a half bridge.

12. The wireless power supply of claim 6 wherein the controller configures the wireless power supply as a full bridge by
the controller driving the first inverter as a switching circuit by operating the first switch of the first inverter and the second switch of the first inverter alternately; and
the controller driving the second inverter as a switching circuit by operating the first switch of the second inverter and the second switch of the second inverter alternately in phase with the first inverter.

13. The wireless power supply of claim 6 wherein the controller configures the wireless power supply as a half bridge by
the controller driving the first inverter as a switching circuit by operating the first switch of the first inverter and the second switch of the first inverter alternately; and
the controller driving the second inverter as reference voltage by driving the first switch of the second inverter open and driving the second switch of the second inverter closed.

14. A wireless power supply system for supplying power wirelessly to a remote device, the system wireless power supply comprising:
a controller;
a first half-bridge circuit electrically connected to the controller;
a second half-bridge circuit electrically connected to the controller;
wherein the first half-bridge circuit and the second half-bridge circuit are electrically connected to a primary coil;
wherein the controller selectively configures the wireless power supply between a half-bridge topology and a full-bridge topology by controlling the first half-bridge circuit and the second half-bridge circuit;
wherein the controller selects the half-bridge topology for a first remote device in response to inductive coupling of the first remote device to the wireless power supply and based on feedback from the first remote device;
wherein the controller selects the full-bridge topology for a second remote device that is different than the first remote device in response to inductive coupling of the second remote device to the wireless power supply and based on feedback from the second remote device;
wherein, while the power supply is configured in the half-bridge topology, the controller selectively fine tunes an amount of power delivered to the remote device while configured in the half bridge topology by adjusting a first characteristic based on feedback from the first remote device;
wherein, while the power supply is configured in the full-bridge topology, the controller selectively fine tunes an amount of power delivered to the second remote device by adjusting a second characteristic based on feedback from the second remote device.

15. The wireless power supply of claim 14 wherein the first characteristic is one of at least rail voltage, duty cycle, operating frequency, and phase, and wherein the second characteristic is one of at least rail voltage, duty cycle, operating frequency, and phase.

16. The wireless power supply of claim 14 wherein the controller selectively fine tunes an amount of power delivered to the first remote device while configured in the half-bridge topology by adjusting at least one of duty cycle and operating frequency, and wherein the controller selectively fine tunes an amount of power delivered to the second remote device while configured in the full-bridge topology by adjusting at least one of phase and operating frequency.

17. The wireless power supply of claim 14 wherein the controller selectively fine tunes an amount of power delivered to the first remote device while configured in the half-bridge topology by adjusting operating frequency, and wherein the controller selectively fine tunes an amount of power delivered to the second remote device while configured in the full-bridge topology by adjusting duty cycle.

18. The wireless power supply of claim 14 wherein the controller selectively fine tunes an amount of power delivered to the first remote device while configured in the half-bridge topology by adjusting operating frequency, and wherein the controller selectively fine tunes an amount of power delivered to the second remote device while configured in the full-bridge topology by adjusting phase.

19. The wireless power supply of claim 14 wherein step size of the adjustment of the first characteristic is different from step size of the adjustment of the second characteristic.

20. The wireless power supply of claim 14 wherein the first half-bridge circuit and the second half-bridge circuit are electrically connected to the primary coil through at least one capacitor.

21. The wireless power supply of claim 1 wherein the controller selectively configures the first half-bridge circuit and the second half-bridge circuit to adjust the resonant frequency of the wireless power supply.

22. The wireless power supply of claim 1 wherein each of the plurality of different bridge topologies provide a different range of power and wherein the controller selectively configures the wireless power supply to fine tune an amount of power delivered to the remote device within the range of power for each of the plurality of different bridge topologies by adjusting a characteristic of at least one of the half bridge circuits to meet a remote device power request.

23. The wireless power supply of claim 22 wherein the different ranges of power at the plurality of different bridge topologies are provided while maintaining a constant resonant frequency for the wireless power supply.

24. The wireless power supply of claim 6 wherein the controller selectively configures the first inverter and the second inverter to adjust the resonant frequency of the wireless power supply.

25. The wireless power supply of claim 6 wherein each of the plurality of different bridge topologies provide a different range of power and wherein the controller selectively configures the wireless power supply to fine tune an amount of power delivered to the remote device within the range of power for each of the plurality of different bridge topologies by adjusting a characteristic of at least one of the inverters to meet a remote device power request.

26. The wireless power supply of claim 25 wherein the different ranges of power at the plurality of different bridge topologies are provided while maintaining a constant resonant frequency for the wireless power supply.

27. The wireless power supply of claim 14 wherein the controller selectively configures the first half-bridge circuit and the second half-bridge circuit to adjust the resonant frequency of the wireless power supply.

28. The wireless power supply system of claim 14 wherein the half-bridge topology and the full-bridge topology each provide a different range of power and wherein the controller selectively configures the wireless power supply to fine tune an amount of power delivered to the first or second remote device within the range of power for each of the half-bridge topology and the full-bridge topology by adjusting a characteristic of at least one of the half bridge circuits to meet a first or second remote device power request.

29. The wireless power supply of claim 28 wherein the first range of power provided by the half-bridge topology and the second range of power provided by the full-bridge topology are provided at a constant resonant frequency for the wireless power supply.

* * * * *